(12) United States Patent
Englisch et al.

(10) Patent No.: US 7,981,824 B2
(45) Date of Patent: Jul. 19, 2011

(54) QUARTZ GLASS BLANK AND METHOD FOR PRODUCING SAID BLANK

(75) Inventors: Wolfgang Englisch, Kelkheim (DE); Ralf Takke, Hanau (DE); Bodo Kuehn, Gelnhausen/Hailer (DE); Bruno Uebbing, Alzenau (DE); Rainer Koeppler, Seligenstadt (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 850 days.

(21) Appl. No.: 11/597,087
(22) PCT Filed: May 11, 2005
(86) PCT No.: PCT/EP2005/005059
§ 371 (c)(1),
(2), (4) Date: Dec. 19, 2007
(87) PCT Pub. No.: WO2005/114328
PCT Pub. Date: Dec. 1, 2005

(65) Prior Publication Data
US 2008/0274869 A1 Nov. 6, 2008

(30) Foreign Application Priority Data
May 17, 2004 (DE) .................. 10 2004 024 808

(51) Int. Cl.
C03C 3/06 (2006.01)
C03B 19/06 (2006.01)
C03B 19/00 (2006.01)
C03B 23/00 (2006.01)
C03B 7/14 (2006.01)

(52) U.S. Cl. .......... 501/54; 65/17.4; 65/17.6; 65/64; 65/122

(58) Field of Classification Search ........ 501/53, 501/54; 65/17.4, 17.6, 104, 63, 64, 117, 65/118, 122, 134.1, 135.6, 136.1
See application file for complete search history.

(56) References Cited

U.S. PATENT DOCUMENTS
4,786,618 A * 11/1988 Shoup ..................... 501/12
(Continued)

FOREIGN PATENT DOCUMENTS
DE 42 04 406 8/1993
(Continued)

OTHER PUBLICATIONS

Copley et al., "The influence of titania upon the thermal expansion of vitreous silica," Physics and Chemistry of Glasses vol. 14 No. 4, Aug. 1973, pp. 73-76.
(Continued)

Primary Examiner — Jerry Lorengo
Assistant Examiner — Noah S Wiese
(74) Attorney, Agent, or Firm — Tiajoloff and Kelly LLP (57) ABSTRACT

The present invention relates to a quartz glass blank for an optical component for transmitting radiation of a wavelength of 15 nm and shorter, the blank consisting of highly pure quartz glass, doped with titanium and/or fluorine, which is distinguished by an extremely high homogeneity. The homogeneity relates to the following features:

a) micro-inhomogeneities caused by a local variance of the $TiO_2$ distribution (<0.05% $TiO_2$, averaged over a volume element of $(5\ \mu m)^3$ in relation to the mean value of the $TiO_2$ content), b) an absolute maximum inhomogeneity in the thermal expansion coefficient $\Delta\alpha$ in the main functional direction (<5 ppb/K), c) a radial variance of the thermal expansion coefficient over the usable surface of the quartz glass blank of not more than 0.4 ppb/(K.cm);

d) a maximum stress birefringence (SDB) at 633 nm in the main functional direction of 2 nm/cm with a specific progression; and e) a specific progression of the $\Delta\alpha$, averaged according to (b) on the optical surface.

Said quartz glass blank can only be obtained in that a doped quartz glass obtained by flame hydrolysis of a compound containing silicon, titanium and/or fluorine is formed as a large volume rod-shaped starting body into a homogeneous quartz glass blank using several forming steps and is homogenized.

13 Claims, 6 Drawing Sheets

U.S. PATENT DOCUMENTS

| | | | |
|---|---|---|---|
| 5,364,433 A * | 11/1994 | Nishimura et al. | 65/17.4 |
| 5,443,607 A | 8/1995 | Englisch et al. | |
| 5,790,315 A | 8/1998 | Fujinoki et al. | |
| 6,576,578 B1 | 6/2003 | Ikuta et al. | |
| 6,849,114 B2 * | 2/2005 | Oswald et al. | 106/286.4 |
| 2003/0226377 A1 * | 12/2003 | Barrett et al. | 65/17.4 |

FOREIGN PATENT DOCUMENTS

| | | |
|---|---|---|
| DE | 695 16 571 | 9/1995 |
| DE | 198 41 932 | 3/2000 |
| DE | 100 54 270 | 5/2002 |
| DE | 103 18 935 | 11/2004 |
| EP | 1 067 097 | 1/2001 |
| EP | 1 125 897 | 8/2001 |
| JP | 2001-122625 | 5/2001 |
| WO | WO 01/08163 | 2/2001 |

OTHER PUBLICATIONS

Schultz et al., "Ultra-Low-Expansion Glasses and Their Structure in the SiO2-TiO2 System," Amorphous Materials, 1971, Wiley-Interscience, pp. 453-461.

Iwahashi et al., "Development of modified zero expansion Ti-dope silica glass for EUVL substrate," 2nd International Extreme Ultraviolet Symposium, Book of Abstracts.

Pavlova et al., "Physicochemical Properties of Glasses with a Low Thermal Expansion Coefficient . . . ," Neorgan. Materialy, vol. 11, No. 9, Sep. 1975, p. 1686-1689, Russia.

Greeger, "Investigation of TiO2-SiO2 Glasses by X-Ray Absorption Spectroscopy," Journal of Non-Crystalline Solids 55, 1983, p. 27-43, North-Holland Publishing Co.

Patent Abstracts of Japan, for JP 2001-122625, May 8, 2001, JPO.

espacenet English language abstract for DE 198 41 932, Mar. 16, 2000.

* cited by examiner

Top view

QUARTZ GLASS BLANK AND METHOD FOR PRODUCING SAID BLANK

The present invention relates to a quartz glass blank for an optical component for transmitting extremely shortwave ultraviolet radiation of a wavelength of 15 nm and shorter, and to a method for producing the quartz glass blank according to the preamble of claim 1.

Optical components of synthetic quartz glass are used for transmitting ultraviolet laser radiation, for instance in the form of exposure or projection optics of microlithography devices for producing large-scale integrated circuits in semiconductor chips. The exposure systems of current standard microlithography devices are equipped with excimer lasers that output pulsed UV radiation of a wavelength of 248 nm (KrF laser) or of 193 nm (ArF laser). With such devices it is possible to produce large-scale integrated circuits in semiconductor chips with line widths of 75 nm ("half-pitch"). However, a new generation of large-scale integrated circuits with a line width of $\leq 50$ nm require microlithographic projection devices that operate with extreme ultraviolet light (EUV), also called "soft" X-ray radiation, with wavelengths of less than 15 nm. With the help of such a radiation and of the optical components the desired structure must here be projected onto the silicon wafer to be structured. A distortion-free transmission of the mask structure is here required, which presupposes a defect-free optical component for the whole service life of the projection device, both on the surface and in the volume of the optical component. In the prior art, especially convex or concave mirror elements of highly pure titanium-doped quartz glass or of an aluminum-silicate glass ceramic (Zerodur$^{TR}$) are known in such lithography devices, said mirror elements being coated with a reflective layer. Both materials are inter alia distinguished by an extremely low coefficient of thermal expansion. This property is of great importance for the reason that the optical components, normally mirror elements, are heated up by the shortwave radiation in the exposure process of the silicon wafer on account of the non-ideal reflectivity (reflecting power about 70%) of the components. This heating, which can definitely amount to 50° C. or more, must however not lead to deformation and thus deterioration of the imaging quality. Since there are no cooling systems compensating for the heating-up process, the thermal expansion of the optical components must be virtually zero.

In the case of the titanium-doped quartz glass, the thermal expansion is defined by the concentration of the dopant, by its incorporation into the glass matrix, and by the thermal history of the component.

As for the concentration dependence of the thermal expansion,
G. A. Pavlova and A. N. Amatuni in "Physicochemical Properties of Glasses with a Low Thermal Expansion Coefficient in the System SiO$_2$—TiO$_2$" (Neorganicheskie Materialy, Vol. 11, No. 9, pp. 1686-1689, September 1975);
G. J. Copley, A. D. Redmond and B. Yates in "The Influence of Titania upon the Thermal Expansion of Vitreous Silica" (Physics and Chemistry of Glasses, Vol. 14, No. 4, August 1973)
and
P. C. Schultz and H. T. Smyth, ed. in "Ultra-Low-Expansion Glasses and Their Structure in the SiO$_2$—TiO$_2$ System" (Amorphous Materials, ed. R. W. Douglas and B. Ellis (1971), WILEY-INTERSCIENCE: London, New York, Sydney, Toronto. 453-461)
published comprehensive articles, while the subject "incorporation into the matrix" has been dealt with by the authors Robert B. Greegor, Farrel W. Lytle, Donald R. Sandstrom, Joe Wong, and Peter Schultz in "Investigation of TiO2-SiO2 Glasses by X-Ray Absorption Spectroscopy" (Journal of Non-Crystalline Solids, 55,1983, pp. 27-43).

Y. Iwahashi, S. Kikugawa, A. Koike, N. Sugimoto comment on the relationship between expansion coefficient and thermal history of the component in "Development of modified zero expansion Ti-dope silica glass for EUVL substrate", 2$^{nd}$ International Extreme Ultraviolet Symposium, 30.09.-Feb. 10, 2003, Book of Abstracts.

Single-phase glass, such as titanium-doped quartz glass, has the advantage over a glass ceramic that radiation with high-energy EUV light cannot lead to different variations in the glass matrix and the embedded crystals.

On the whole, it should be noted that the qualification of a specific quartz glass quality for preventing or at least minimizing structural damage, which reduces radiation resistance, is defined by local stoichiometry deviations and by its chemical composition. Several factors simultaneously play a role, particular importance being attached to the dopant (titanium) while the hydrogen content and the OH content in the quartz glass are also influencing factors with respect to the optical properties through the defect center formation.

As for the method, it is known from WO 01/08163 that titanium-doped quartz glass for EUV lithography is produced by way of a flame hydrolysis method, wherein an Si-containing and a Ti-containing precursor compound is converted in a burner flame into Ti-doped, finely divided SiO$_2$ particles, also called "soot", which are deposited in a large-volume muffle and are directly vitrified there into a massive quartz glass block. The resulting glass block of Ti-doped quartz glass has a diameter of up to 1.5 meters at a thickness of about 15 cm. Following a thorough inspection regarding possible inhomogeneities (inclusions, striae), defect-free sections are drilled out of said quartz glass block and are then subjected to further treatment steps, such as grinding, polishing, coating with a reflective layer, etc., which are required for the respective optical component in the EUV projection device. The drawback is here that only a very small portion of the large volume quartz glass block might be usable for the desired application with respect to the homogeneity in the expansion coefficient and other properties and that the remainder has to be thrown away.

It is therefore the object of the present invention to provide a quartz glass blank for an optical component which is better suited for the transmission of ultraviolet radiation of a wavelength of 15 nm and shorter, and at a predetermined pulse energy density of $\epsilon \geq 0.1$ μJ/cm$^2$.

It is also the object of the present invention to provide a systematic, economic and efficient method for producing such a quartz glass blank, wherein only a rough pre-selection/inspection is needed for excluding e.g. extreme inhomogeneities or large bubbles.

As for the quartz glass blank the above object is achieved according to the invention through an embodiment of a quartz glass blank which comprises the combination of the following properties:

The quartz glass blank contains
a) micro-inhomogeneities caused by a local variance of the TiO$_2$ distribution of less than 0.05% TiO$_2$ averaged over a volume element of (5 μm)$^3$ in relation to the mean value of the TiO$_2$ content in the quartz glass blank;
b) an absolute maximum inhomogeneity in the thermal expansion coefficient $\Delta\alpha$ averaged over the height of the main functional direction (cylinder axis, see FIG. 2) on the optically used surface CA ("clear aperture") of the quartz glass blank of less than 5 ppb/K;

c) a progression of the Δα, averaged according to (b), on the optically used surface, which can substantially be described by formula (1):

$$\Delta a = C_0^a + C_3^a\left(2\left(\frac{r}{R}\right)^2 - 1\right) + C_8^a\left(6\left(\frac{r}{R}\right)^4 - 6\left(\frac{r}{R}\right)^2 + 1\right) \quad (1)$$

and whose residual inhomogeneity of the thermal expansion after deduction of (1) is not more than 0.5 ppb/K, where $C_0^a \leq 5$ ppb/K;

d) a (radial) variance of the thermal expansion coefficient over the usable surface of the quartz glass blank of not more than 0.4 ppb/(K·cm); and e) a maximum stress birefringence (SDB) at 633 nm in the main functional direction of 2 nm/cm, whose progression can substantially be described by formula (2):

$$SDB = C_0^{SDB} + C_3^{SDB}\left(2\left(\frac{r}{R}\right)^2 - 1\right) + C_8^{SDB}\left(6\left(\frac{r}{R}\right)^4 - 6\left(\frac{r}{R}\right)^2 + 1\right) \quad (2)$$

wherein the variables in formulae (1) and (2) mean the following:

r=radial distance from the cylinder axis;

R=maximum radius of the optically used surface on the quartz glass blank, normally called CA "clear aperture";

$C_0$, $C_3$, $C_8$=adaptation parameters of the spherical Zernike term, each different in formulae (1) and (2).

In comparison with the Ti-doped quartz glass qualities which have so far been described in the literature and configured for use under extreme ultraviolet light with respect to a small range of the thermal expansion coefficient Δα, the quartz glass from which the blank of the invention is made is inter alia distinguished by a particular form of distribution for the remaining small inhomogeneities of the thermal expansion coefficient over the usable surface of the blank, and by the small portion of high-frequency stress birefringence.

It has however been found that with respect to the high demands made on a constant imaging quality of the optical components it is not only an extremely small absolute and relative variance of the expansion coefficient a that is needed, but it is also the way how the slightly varying α is distributed that constitutes an essential feature for the quality and applicability of the quartz glass blank.

The minimal differences in the expansion coefficient inside a quartz glass blank are due to specific production procedures. For instance, the layerwise deposition of the doped $SiO_2$ particles leads to a special distribution of the dopant titanium that is not always suited for the intended use. Furthermore, the atmosphere prevailing during deposition and/or vitrification may have some influence on the oxidation state of the titanium in the $SiO_2$ network. In the end these effects bring about minimal local differences in the expansion coefficient that require an exact determination of the properties.

Furthermore, it is of great importance that the distribution of the elements Si, O, Ti and optionally F and also of Si—OH groups is substantially homogeneous, and that stress birefringence and its gradients are minimized. Layer structures perpendicular to the main functional direction are largely avoided according to the invention, and inclusions or/and bubbles are of course not acceptable and do virtually not arise in the quartz glass blank according to the invention, or they are removed from the starting material by the homogenization method according to the invention, if necessary.

Figure 1:
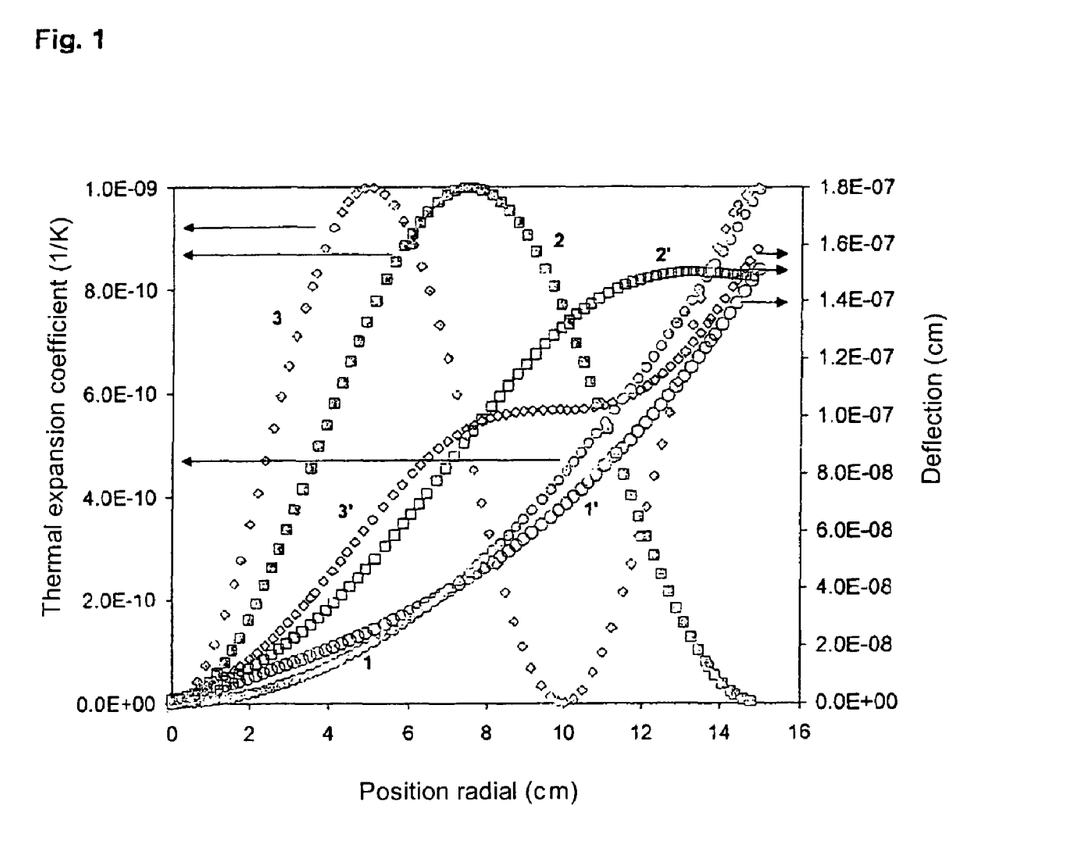

As for aberration, which should be excluded as much as possible, particular attention should be paid to deformation of the mirror upon heating, for an optimized distribution of the expansion coefficient according to formula (1) has an effect on the deformation, as shown in FIG. 1:

Inhomogeneities of the thermal expansion coefficient bring about a low-frequency bend of the mirror surface substantially on the edge, which can be controlled by way of active correction measures. Such correction measures are taken for example in very large telescopes (example: VLT 'very large telescope') by way of so-called actuators which compensate for deformations of the mirror.

By contrast, arbitrary or high-frequency (closely adjacent) inhomogeneities result in a considerable offset on every point of the surface, which cannot be compensated or can only be compensated under great efforts.

The optimization of the progression of the expansion coefficient in combination with a minimization of micro-inhomogeneities and layers that might impair the polishing property permits the use of the quartz glass blank as an optical component for EUV lithography.

Further advantageous embodiments of the invention are contained in the subclaims.

It has turned out to be particularly expedient to introduce the dopants fluorine and/or titanium, with $TiO_2$ being contained in the range between 5% by wt. and 10% by wt. and fluorine in the range between 4% by wt. and 6% by wt. in the quartz glass. In the case of a combination of the two aforesaid dopants, dimensioning rules (3) and (4) are expediently applicable to the determination of the $TiO_2$ content and the fluorine content, respectively:

$TiO_2$ [% by wt.]=7.4–1.6·fluorine content [% by wt.]   (3)

fluorine content [% by wt.]=4.5–0.614·$TiO_2$ content [% by wt.]   (4)

Moreover, the stress birefringence (SDB) at 633 nm perpendicular to the main functional direction (cylinder axis) is not more than 5 nm/cm, the substantial portion accounting for low-frequency portions whose gradient does not exceed 50 (nm/cm)/cm. The measurement resolution is 1 mm in accordance with the size of the laser measurement spot. Since optical components with curved surfaces (spherical mirrors) are primarily of relevance to the invention, stress birefringence must be determined and optimized in dependence on the radius of curvature also in a direction perpendicular to the functional direction (as for the functional directions, see also FIG. 2). The feature of SDB, however, also serves to characterize the absence of layers.

Figure 2:
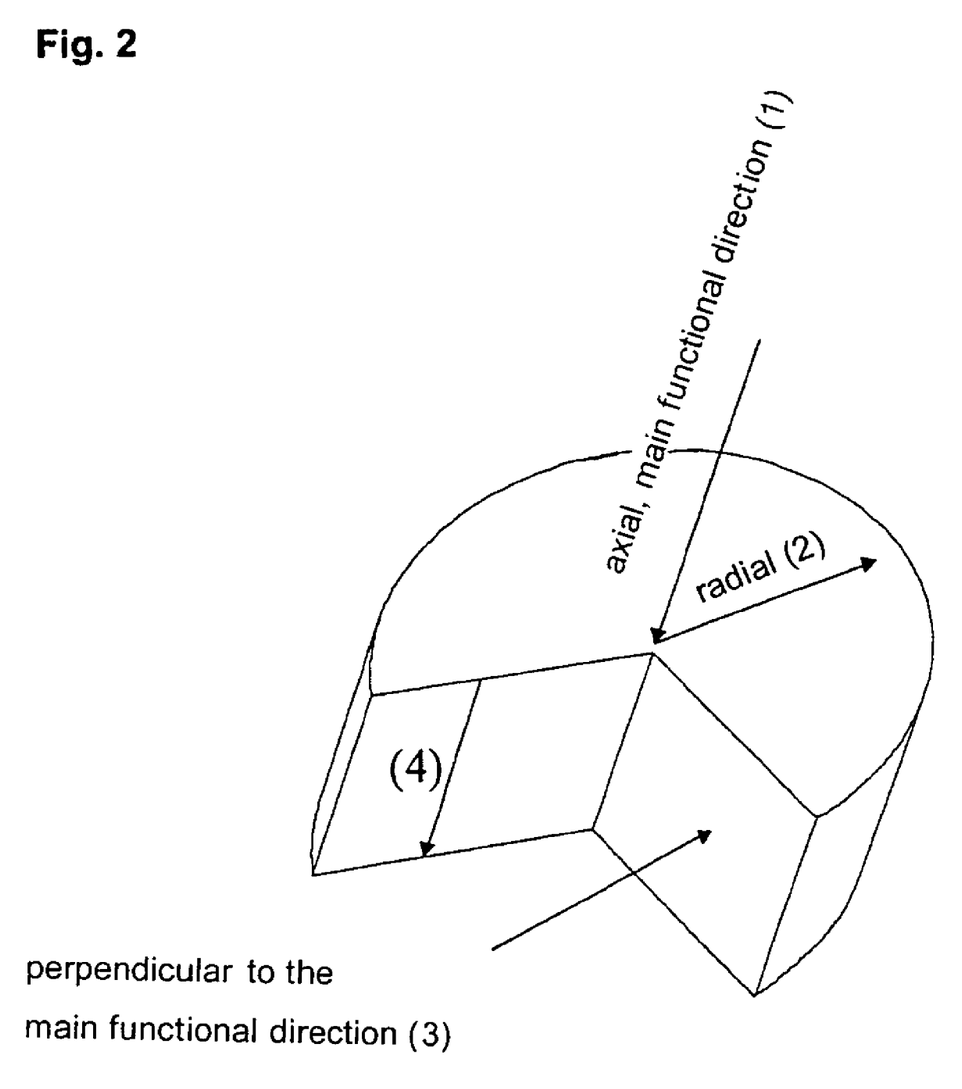
FIG. 2: the geometry of a mirror substrate plate with its functional directions.

In a preferred embodiment the quartz glass blank has a mean OH content in the range of 700 wt ppm to 1000 wt ppm due to the manufacturing process using direct vitrification (so-called DQ method), the variation of the OH content, averaged over the thickness of the quartz glass blank (corresponds to the functional direction (4) of FIG. 2), not exceeding ±50 ppm in the area of the main functional direction. Such a low variance in the OH content is required for keeping the optical and also the thermal properties of the quartz glass as homogeneous as possible.

The adjustment of the structural temperature $T_f$ at <950° C. has turned out to be a further advantageous feature in connection with the quartz glass blank according to the invention because this leads to a further reduction of the thermal expansion in comparison with a blank having the same composition, but a higher fictive temperature. The indicated upper limit of 950° C. for the fictive temperature only regards quartz glass qualities with a relatively high OH content. If the OH content is slightly smaller than 300 wt ppm, a fictive temperature of more than 1000° C. must be set.

As for the method for producing a quartz glass blank, the above-indicated object, starting from the above-indicated method, is achieved according to the invention in that a doped quartz glass obtained by flame hydrolysis of a silicon-containing and a titanium-containing and/or fluorine-containing compound is formed as a large-volume rod-shaped starting body into a homogeneous quartz glass blank by means of a plurality of forming steps and is homogenized, the starting body, which is held between two holders, being first heated zonewise to the melting temperature, and the heated zone is treated in this process by a relative movement of the two holders relative to each other, resulting in a substantially cylindrical twist body which is subsequently softened in at least one further forming step in a heatable mold and is deformed in the mold into a quartz glass blank under a force acting in axial direction.

The cylindrical twist body, which is obtained by zonewise heating and treatment at the melting temperature, will still contain inhomogeneities in its longitudinal axial direction, which inhomogeneities must be removed in at least one further forming step. To this end the twist body is put into a heatable mold in which it softens under its own weight, by application of an additional force acting in axial direction, into a more or less thick plate. Instead of the slow immersion of the twist body into a heatable mold, the same deformation may also be accomplished in that the twist body is continuously supplied to a heating zone and softened there in the middle portion of its length in a mold arranged in the heating region. The plate obtained in this way still contains the inhomogeneity layers substantially in the same relative position as in the twist body. For further homogenization the plate can therefore serve subsequently either directly as a starting body for a renewed twisting, or the plate is first formed into a rod which will only be subjected thereafter to a further twisting process. If the homogenization degree has progressed to a sufficient degree, possibly by the aforementioned forming and blending procedures being repeated several times, the twist body is given its final shape as a quartz glass blank from which the desired optical component is then cut out and finished by grinding and polishing.

The holders for the twisting process and the starting bodies expediently consist of the same quartz glass material. This is advantageous during heating for preventing mechanical stresses at the contact point between starting body and holder because otherwise this might lead in a very adverse case to the holder being torn off. Furthermore, the uniformity of the material prevents the introduction of impurities.

The invention shall now be explained in more detail with reference to embodiments and drawings, which show in FIG. 1: a chart on the (inhomogeneous) distribution of the thermal expansion coefficient in comparison with the offset of the volume elements caused thereby;

FIG. 6: (A) a shadowgraph of non-homogenized Corning ULE™;

(B) a shadowgraph of homogenized Corning ULE™.

A synthetic quartz glass of the company Corning with the name ULE™ is used as the starting material. This material quality contains about 7% by wt. of $TiO_2$ as dopant. A square sample of this starting material is measured with respect to the sizes that are here of relevance. A maximal variance of the $TiO_2$ content of 0.6% by wt. is detected over the length of the sample. Furthermore, a clearly visible striation in two viewing directions of the square sample is observed, whereas the third direction seems to be clear and substantially without any layer structures, but with variances in the thermal expansion coefficient $\alpha$ with up to 60 ppb/K. The striation is visibly illustrated as a shadowgraph with FIG. 6A and is based on the layerwise build-up process for the quartz glass. Also with respect to stress birefringence, a direction-dependent stress profile is determined in radial direction, from which conclusions can be drawn about the build-up process of the original large-volume quartz glass body, from which the sample was taken. Differences in the stress profile of up to 20 nm/cm are here determined on the sample.

The OH content of the ULE™ glass is measured to be 840 wt ppm; the hydrogen content is about $2 \times 10^{18}$ molecules/$cm^3$, and the fictive temperature $T_f$ is about 910° C.

Hence, after the start data of the Ti-doped quartz glass have been determined, a larger rod-shaped starting body is now prepared with the basic dimensions 90×90×1000 mm for homogenization. For this purpose the end pieces of the starting body are first rounded by grinding and a quartz glass holder, so-called "pipe", is welded to each end. The pipes also consist of Ti-doped quartz glass, so that no differences have to be expected in the expansion characteristics of the holders and of the original starting body. The starting body prepared in this way is clamped in a twist lathe (lathe-like machine with the possibility of local heating) and is twisted about its longitudinal axis, with a part of the starting body being heated by burners to more than 2000° C. The softened glass mass is intensively blended in radial direction through the relative movement of the two holders relative to one another with formation of a twist body. The twist body has a diameter (Ø) of about 100 mm and a length of 450 mm. The relative movements include a synchronous or asynchronous rotation with a superposed movement of the holders parallel to the longitudinal axis of the start body.

Inhomogeneities or layers in radial direction are removed by this process, whereas inhomogeneities extending in the longitudinal direction of the starting body remain as striae or layers. Therefore, at least one further forming step is subsequently carried out, in which step the essentially cylindrical twist body is put into a mold in which it collapses under corresponding heat action (temperature about 1800° C.) and its own weight. Thus a plate with a diameter of about 350 mm and a height of about 70 mm is formed from the twist body. This plate is prepared by removing the edge parts and by parallel grinding of the two cover surfaces for the measurement of the homogeneity characteristics.

This yields a homogenized quartz glass plate for a mirror substrate with the dimensions Ø300×40 mm with different radial distributions of the coefficients of thermal expansion, as shown in FIG. 1. The mirror is heated (purely arithmetically) homogeneously by 20 K. The thermal expansion that does not disappear leads to the deflection (→"offset") of the individual volume elements as compared with the "desired" position without a rise in temperature. The offset is shown for the central plane of the substrate; the offset only changes slightly with the height in the substrate. Curves 1, 2, 3 show the different distributions of the thermal expansion; curves 1', 2', 3' the resulting offset. A parabolic distribution of the thermal expansion turns out to be advantageous with respect to more strongly oscillating distributions because the deflection is smaller on the whole and possible corrections can be more easily performed by active elements. For the illustration of the geometry of the mirror substrate plate and its main functional direction, reference is made to FIG. 2, where the direction designated by (1) stands for the axial main functional direction, and the directions designated by (2) and (3) represent functional directions perpendicular to (1). (4) designates the direction with which a value, averaged over the substrate thickness, is determined.

Figure 3A:
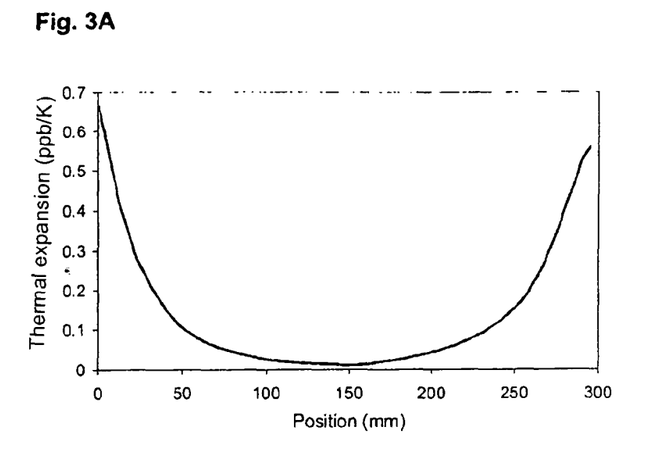
FIG. 3A, 3B, 3C: the progression of $\Delta\alpha$ in the main functional direction according to formula (1)

Furthermore, FIG. 3A shows the progression of the absolute value of the thermal expansion coefficient a in the main functional direction over the diameter of the homogenized mirror substrate plate. A very homogeneous progression can be made out, "major" deviations of up to 0.6 ppb/K being only made out on the edge of the plate.

Figure 3B:
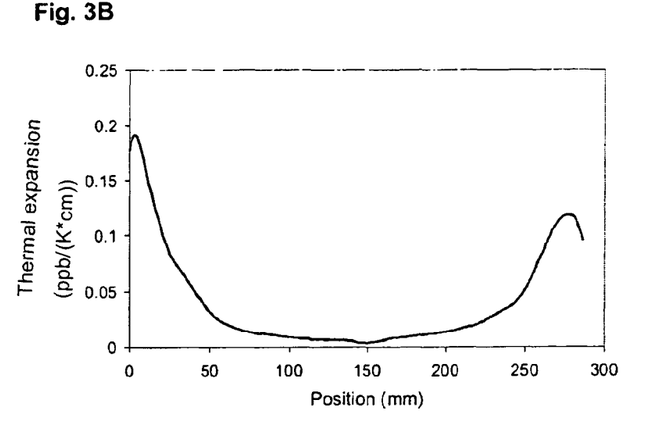

FIG. 3B shows the measurement results in relation to the progression of the averaged gradient of the thermal expansion coefficient $\Delta\alpha$ on the optical surface of the mirror substrate plate in the main functional direction. The above-described negative "edge effects" can here also be observed, but apart from this only a minimal change of $\Delta\alpha$ in the central surface of the sample can be detected.

Figure 3C:
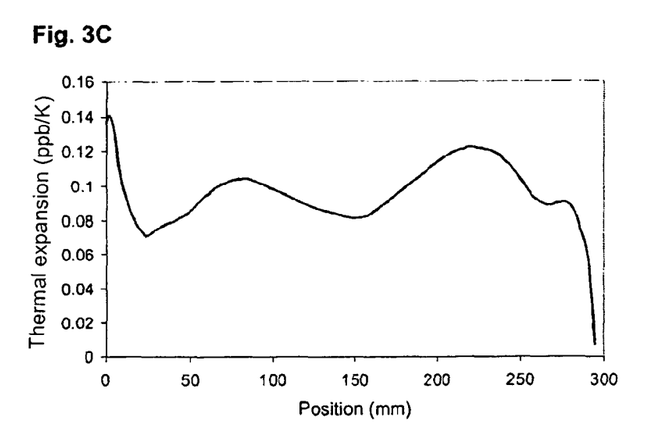

Finally, FIG. 3C shows the progression of the so-called residual inhomogeneity in relation to the expansion coefficient after deduction of formula (1). The residual inhomogeneity of $\Delta\alpha$ is 0.07 ppb/K.

Figure 4A:
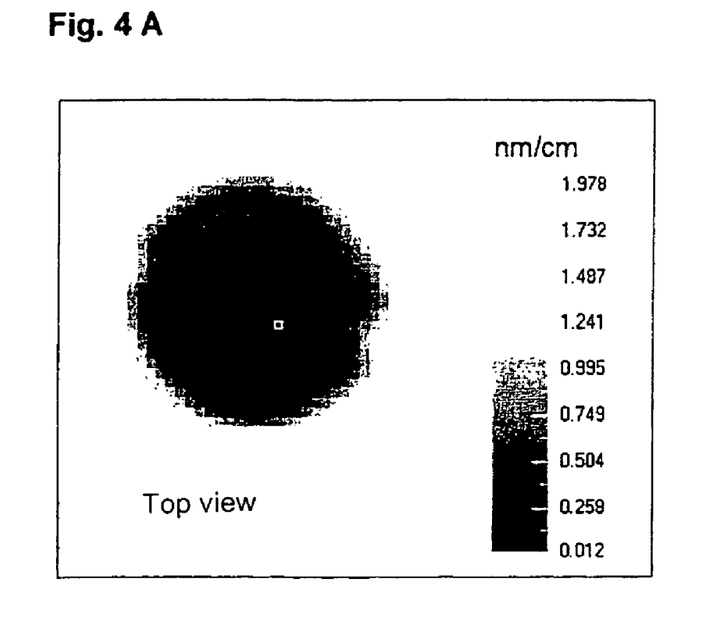
FIG. 4A, 4B: the progression of stress birefringence as a top view in the shadowgraph—and in radial section.
Figure 4B:
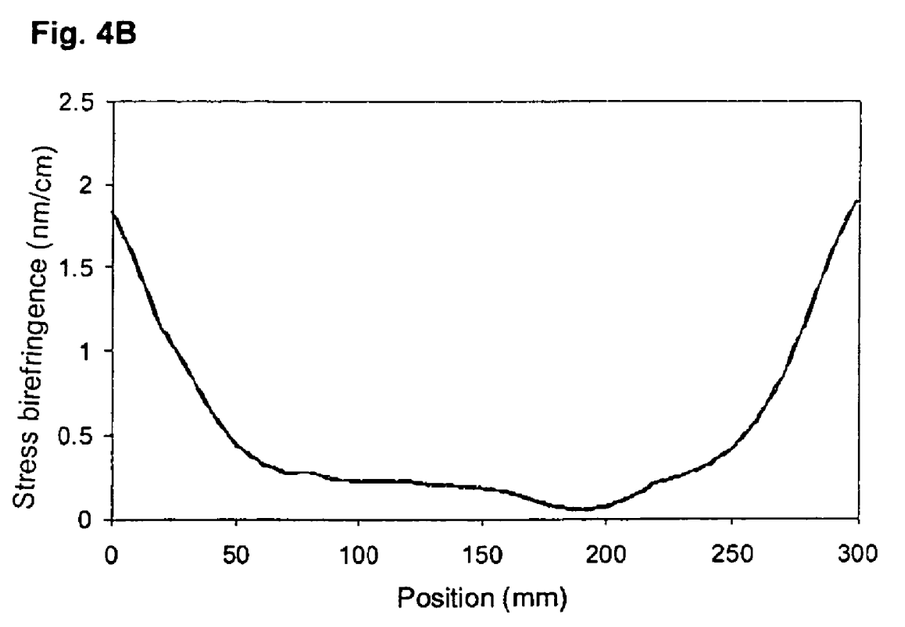

The progression of stress birefringence is shown in FIGS. 4A, 4B and 5A, 5B. The illustration in a top view hints at a substantially stress-free plate, apart from the "edge effects", considering the corresponding gray level scale. The edge effects may be due to strains on the edge of the sample and may be caused by the mechanical finishing treatment of the plate. The progression of the SDB over the diameter of the plate (radial cutting direction according to FIG. 2) of the cylindrical sample plate is shown in FIG. 4B.

Figure 5A:
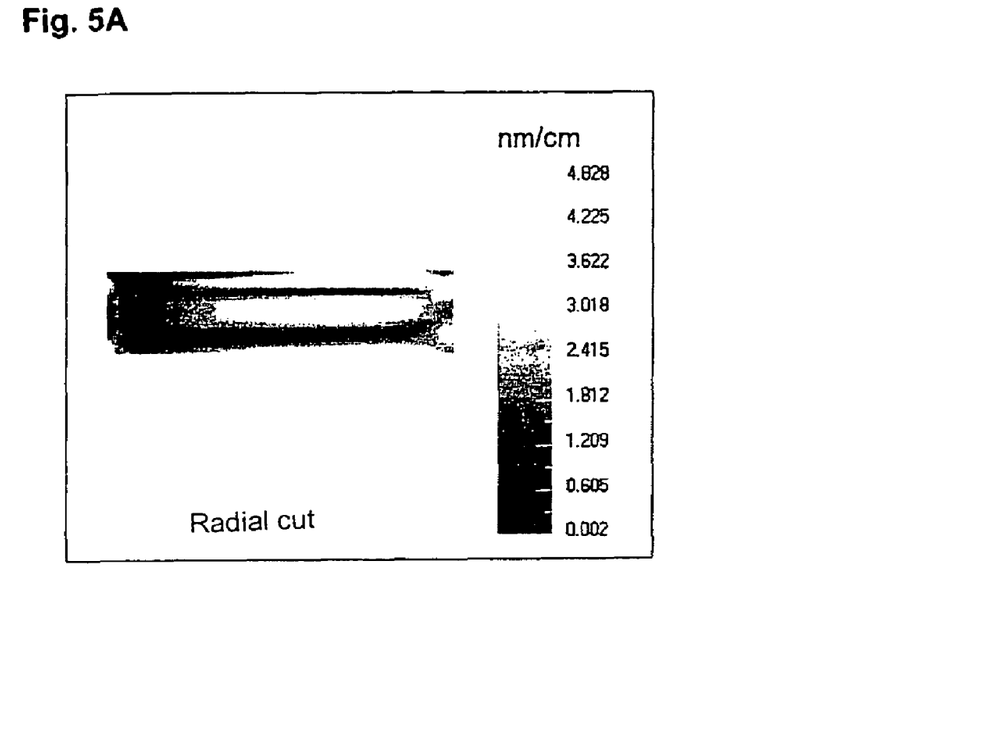
FIG. 5A, 5B: the progression of stress birefringence as a radial section in the shadowgraph and in two further sectional planes.
Figure 5B:
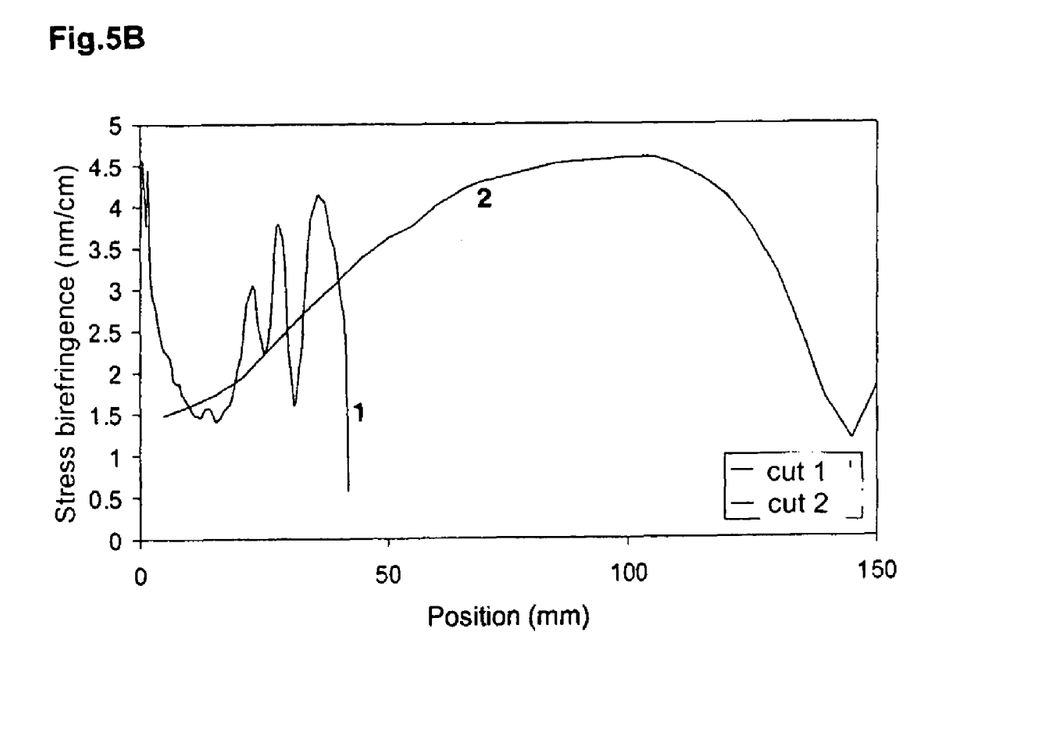

FIG. 5A shows the stress profile of a half of a diametrical cut of the mirror substrate plate, a certain striation being here detectable. FIG. 5B illustrates this striation in a better way with reference to the progression of SDB in two cutting directions. The SDB curve of cut 1 extends over the thickness of the plate, for instance in the middle of the diametrical cut. By contrast, cut 2 extends radially approximately in the middle of the plate.

Figures 6A, 6B:
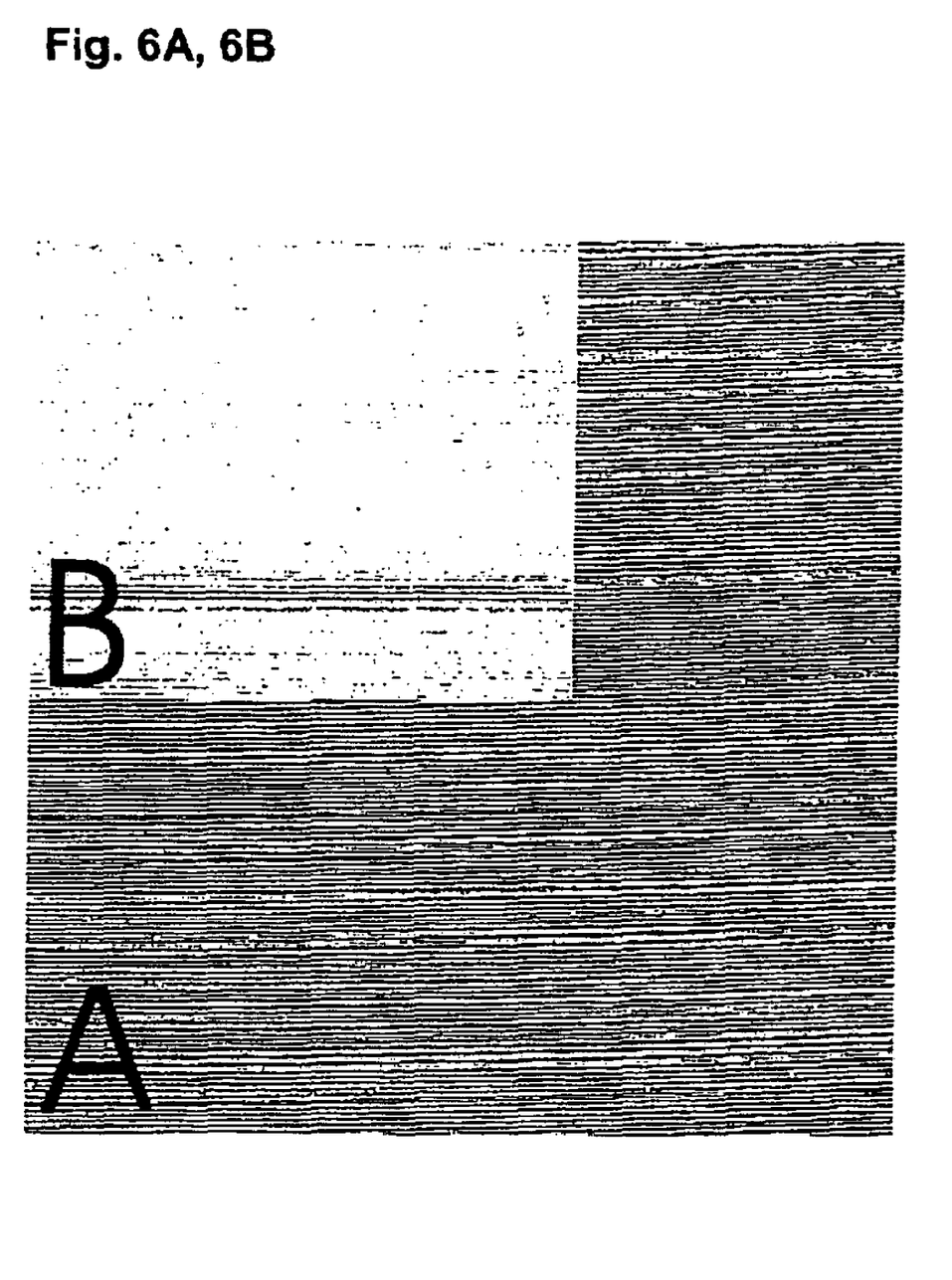

The shadowgraph of FIG. 6B shows a quartz glass blank substantially freed from layers. This improvement becomes particularly apparent in a direct comparison with the initial state shown in FIG. 6A.

Moreover, the variance of the $TiO_2$ content after homogenization has been improved considerably and is only 0.05% by wt. at the most over the surface of the mirror substrate plate, in comparison with the initial variance in the $TiO_2$ content of 0.6% by wt.

The measurement results on the mirror substrate plate are proof of the success of the homogenization method of the invention and thus of the suitability of the material for use in EUV lithography.

The invention claimed is:

1. A quartz glass blank for an optical component for transmitting radiation of a wavelength of 15 nm and shorter, said blank being cylindrical and having a cylinder axis with a height, and comprising highly pure quartz glass, doped with titanium and/or fluorine, wherein said quartz glass has:
   a) micro-inhomogeneities caused by a local variance of a distribution of $TiO_2$ therein of less than 0.05% $TiO_2$ averaged over a volume element of $(5 \,\mu m)^3$ in relation to a mean value of a $TiO_2$ content in the quartz glass blank;
   b) a thermal expansion coefficient, averaged over the height of the cylinder axis, varying over an optically used surface of the quartz glass blank with a maximum inhomogeneity of less than 5 ppb/K;
   c) the thermal expansion coefficient varying along the optically used surface substantially according to $\Delta\alpha$ from the formula (1):

$$\Delta\alpha = C_0^\alpha + C_3^\alpha \left(2\left(\frac{r}{R}\right)^2 - 1\right) + C_8^\alpha \left(6\left(\frac{r}{R}\right)^4 - 6\left(\frac{r}{R}\right)^2 + 1\right) \quad (1)$$

wherein a residual inhomogeneity of the thermal expansion coefficient after subtraction of $\Delta\alpha$ according to the formula (1) from the thermal expansion coefficient is not more than 0.5 ppb/K, where $C_0^\alpha < 5$ ppb/K;
   d) the thermal expansion coefficient having a radial variance over the optically used surface of the quartz glass blank of not more than 0.4 ppb/(K cm); and
   e) a stress birefringence at 633 nm averaged over the height of the cylinder axis of not greater than 2 nm/cm and not greater than a maximum stress birefringence (SDB) that varies over the optically used surface of the quartz glass blank substantially according to the formula (2):

$$SDB = C_0^{SDB} + C_3^{SDB}\left(2\left(\frac{r}{R}\right)^2 - 1\right) + C_8^{SDB}\left(6\left(\frac{r}{R}\right)^4 - 6\left(\frac{r}{R}\right)^2 + 1\right) \quad (2)$$

where r is a radial distance from the cylinder axis;
R is a maximum radius of the optically used surface; and
$C_0$, $C_3$, $C_8$ are each an adaptation parameter of the associated spherical Zernike term of formulas 1 or 2.

2. The quartz glass blank according to claim 1, wherein the quartz glass blank contains 5 to 10% by wt. of $TiO_2$ or 4 to 6% by wt. of fluorine or a linear combination wherein the $TiO_2$ and the fluorine are present in a $TiO_2$ content and a fluorine content, respectively, according to the dimensioning rules (3) and (4):

$TiO_2$ content [% by wt.]=7.4–1.6*fluorine content [% by wt.] (3)

fluorine content [% by wt.]=4.5–0.614*$TiO_2$ content [% by wt.] (4).

3. The quartz glass blank according to claim 1, wherein the maximum stress birefringence at 633 nm perpendicular to the direction of the cylinder axis does not exceed 5 nm/cm, and wherein a substantial portion of the maximum stress birefringence results in low-frequency portions having a gradient that does not exceed 50 (nm/cm)/cm.

4. The quartz glass blank according to claim 1, wherein the quartz glass blank has a mean OH content in a range of 700 wt ppm to 1000 wt ppm, and a variation of OH content, averaged over a thickness of the quartz glass blank, in an area of the direction of the cylinder axis not exceeding ±50 ppm.

5. The quartz glass blank according to claim 1, wherein the quartz glass blank has a fictive temperature $T_f$ that does not exceed 950° C.

6. A method for producing a quartz glass blank according to claim 1, said method comprising:
   forming a doped quartz glass obtained by flame hydrolysis of a compound containing silicon and titanium and/or fluorine as a large-volume rod-shaped starting body, into a homogeneous quartz glass blank by a plurality of forming steps, said forming steps comprising:
   holding said starting body between two holders;
   heating said starting body zonewise to melting temperature and treating a heated zone thereof by relative movement of the two holders relative to each other, resulting in a substantially cylindrical twist body;

softening the twist body in at least one further forming step in a heatable mold; and deforming the twist body in the mold into a quartz glass blank under a force acting in an axial direction.

7. The method according to claim 6, wherein the holders and the starting body are of the same quartz glass material.

8. A quartz glass blank for an optical component for transmitting radiation of a wavelength of 15 nm and shorter, said blank comprising highly pure quartz glass, doped with titanium or with titanium and fluorine, wherein said quartz glass has:

a) micro-inhomogeneities caused by a local variance of a distribution of $TiO_2$ therein of less than 0.05% $TiO_2$ averaged over a volume element of $(5\ \mu m)^3$ in relation to a mean value of a $TiO_2$ content in the quartz glass blank;

b) a thermal expansion coefficient, averaged over the height of the cylinder axis, varying over an optically used surface of the quartz glass blank with a maximum inhomogeneity of less than 5 ppb/K;

c) the thermal expansion coefficient varying along the optically used surface substantially according to $\Delta\alpha$ from the formula (1):

$$\Delta a = C_0^\alpha + C_3^\alpha \left(2\left(\frac{r}{R}\right)^2 - 1\right) + C_8^\alpha \left(6\left(\frac{r}{R}\right)^4 - 6\left(\frac{r}{R}\right)^2 + 1\right) \quad (1)$$

wherein a residual inhomogeneity of the thermal expansion coefficient after subtraction of $\Delta\alpha$ according to the formula (1) from the thermal expansion coefficient is not more than 0.5 ppb/K, where $C_0^\alpha < 5$ ppb/K;

d) the thermal expansion coefficient having a radial variance over the optical used surface of the quartz glass blank of not more than 0.4 ppb/(Kcm); and e) a stress birefringence at 633 nm averaged over the height of the cylinder axis of not greater than 2 nm/cm and not greater than a maximum stress birefringence (SDB) that varies over the optically used surface of the quartz glass blank substantially according to the formula (2):

$$SDB = C_0^{SDB} + C_3^{SDB}\left(2\left(\frac{r}{R}\right)^2 - 1\right) + C_8^{SDB}\left(6\left(\frac{r}{R}\right)^4 - 6\left(\frac{r}{R}\right)^2 + 1\right) \quad (2)$$

where r is a radial distance of cylinder axis;

R is a maximum radius of the optically used surface CA; and $C_0$, $C_3$, $C_8$ are each an adaptation parameter of the associated spherical Zernike term of formulas 1 or 2; and wherein the quartz glass blank contains 5 to 10% by wt. of $TiO_2$.

9. The quartz glass blank according to claim 8, wherein the maximum stress birefringence at 633 nm perpendicular to direction of the cylinder axis does not exceed 5 nm/cm, wherein a substantial portion of the maximum stress birefringence results in low-frequency portions having a gradient that does not exceed 50 (nm/cm)/cm.

10. The quartz glass blank according to claim 8, wherein the quartz glass blank has a mean OH content in a range of 700 wt ppm to 1000 wt ppm, and a variation of OH content, averaged over a thickness of the quartz glass blank, in an area of direction of the cylinder axis not exceeding +50 ppm.

11. The quartz glass blank according to claim 8, wherein the quartz glass blank has a fictive temperature $T_f$ that does not exceed 950° C.

12. The method for producing a quartz glass blank according to claim 6, wherein the doped quartz glass is doped with titanium or with titanium and fluorine.

13. The method according to claim 12, wherein the holders and the starting body are of the same quartz glass material.

* * * * *